(12) United States Patent
Yetter et al.

(10) Patent No.: US 7,719,380 B2
(45) Date of Patent: May 18, 2010

(54) AC COUPLING CIRCUIT

(75) Inventors: Jeffry D. Yetter, Loveland, CO (US);
Dacheng Zhou, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 64 days.

(21) Appl. No.: 10/920,592

(22) Filed: Aug. 17, 2004

(65) Prior Publication Data

US 2006/0038631 A1    Feb. 23, 2006

(51) Int. Cl.
*H03H 1/02*    (2006.01)
*H01P 5/02*    (2006.01)

(52) U.S. Cl. ..................... 333/24 R; 333/172
(58) Field of Classification Search ............... 333/24 R, 333/172, 24 C, 81 R, 81 A; 327/333, 254; 330/260, 107; 324/126; 257/533

See application file for complete search history.

(56) References Cited

U.S. PATENT DOCUMENTS

| | | | | | |
|---|---|---|---|---|---|
| 4,679,002 | A | * | 7/1987 | Sherwin et al. | 330/66 |
| 5,317,276 | A | * | 5/1994 | Yamamoto | 327/254 |
| 5,815,051 | A | * | 9/1998 | Hamasaki et al. | 333/172 |
| 6,459,323 | B2 | * | 10/2002 | Birkeli | 327/333 |
| 6,597,731 | B1 | * | 7/2003 | Shuholm | 375/220 |
| 6,714,132 | B2 | * | 3/2004 | Edwards et al. | 340/573.1 |

* cited by examiner

*Primary Examiner*—Dean O Takaoka

(57) ABSTRACT

An AC coupling circuit is disclosed herein. An embodiment of the circuit comprises a first differential input and a second differential input. A first resistor is connected between the first differential input and the second differential input. A first capacitor is connected between the first differential input and a first differential output. A second capacitor is connected between the second differential input and a second differential output. A second resistor is connected between the first differential output and a node. A third resistor is connected between the second differential output and the node. A first potential is applied to the node.

25 Claims, 2 Drawing Sheets

AC COUPLING CIRCUIT

BACKGROUND

Integrated circuits consist of a plurality of electronic components located on a substrate, such as a silicon wafer or the like. The electronic components are arranged to form an electronic circuit or a plurality of electronic circuits. One of the purposes of some electronic circuits is to process alternating current (AC) signals. In order to process AC signals, the circuits may need to be AC coupled to other circuits or devices so as to block direct current (DC). Series capacitors are typically used for AC coupling. For example, an AC signal may need to be amplified. If the DC component is amplified, the resulting signal may be saturated. Accordingly, the AC signal is AC coupled to an amplifier.

One problem with processing AC signals using an AC coupling circuit located on an integrated circuit is that the values of the capacitors (AC coupling capacitors) used in the AC coupling circuit are typically relatively large. The large values of the AC coupling capacitors requires that their physical size be too big to be located on the integrated circuit. Therefore, the AC coupling capacitors are required to be located external to the integrated circuit. The external location increases the time required to fabricate a device in which the integrated circuit is located. The external location may also cause the AC coupling circuit to be susceptible to noise. In addition, the physical size of the device containing the AC coupling circuit is large due to the large size of the external AC coupling capacitors.

SUMMARY

An AC coupling circuit is disclosed herein. An embodiment of the AC coupling circuit comprises a first differential input and a second differential input. A first resistor is connected between the first differential input and the second differential input. A first capacitor is connected between the first differential input and a first differential output. A second capacitor is connected between the second differential input and a second differential output. A second resistor is connected between the first differential output and a node. A third resistor is connected between the second differential output and the node. A first potential is applied to the node.

DETAILED DESCRIPTION

Figure 1:
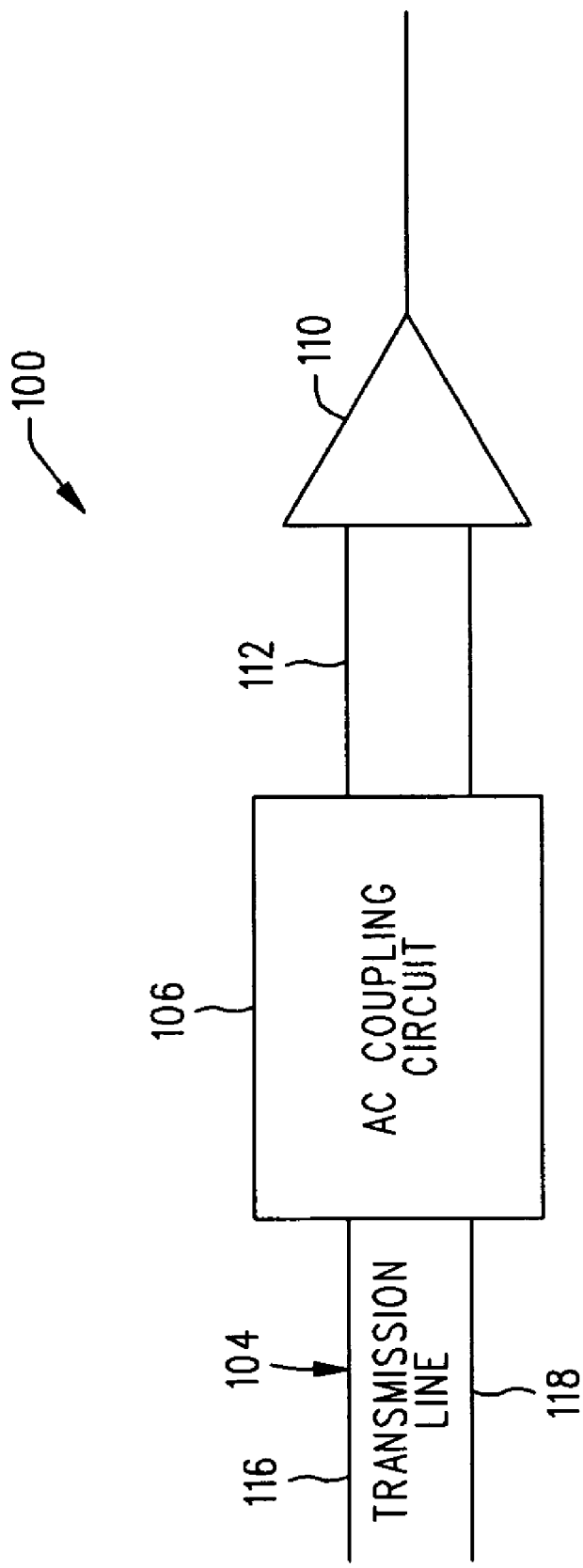
FIG. 1 is a schematic diagram of an embodiment of an electronic circuit including an AC coupling circuit.

An embodiment of a circuit 100 is shown in FIG. 1. The circuit 100 includes a transmission line 104, an alternating current (AC) coupling circuit 106, and a differential amplifier 110. The transmission line 104 is connected to the AC coupling circuit 106 and the AC coupling circuit 106 is connected to the differential amplifier 110 by way of conductors 112. It should be noted that the differential amplifier 110 is for illustration purposes only and that other devices may be connected to the AC coupling circuit 106. The circuit 100 may be fabricated into or located within an integrated circuit. In another embodiment, the AC coupling circuit 106 may be fabricated into or located on an integrated circuit, which may be separate from the other devices of the circuit 100. The AC coupling circuit serves to remove direct current (DC) voltage signals transmitted by way of the transmission line 104. Thus, only the AC component of signals received by the differential amplifier 110 are amplified.

The transmission line 104 is illustrated as being a differential transmission line having a first conductor 116 and a second conductor 118. The characteristic impedance of the conductors may be, as an example, fifty ohms. The differential impedance between the two conductors 116, 118 would then be one hundred ohms. It should be noted that the characteristic impedance of the conductors may depend on materials used in the integrated circuit and/or the impedances of devices, not shown, that are connected to the transmission line 104. Therefore, the characteristic impedance of the transmission line 104 may vary substantially.

The input impedance of the AC coupling circuit 106 is matched to the characteristic impedance of the transmission line 104. For example, if the differential impedance between the conductors 116, 118 of the transmission line 104 is one hundred ohms, the input of the AC coupling circuit 106 would be approximately one hundred ohms.

The differential amplifier 110 is an example of an electronic device that may be connected to the AC coupling circuit 106. It is to be noted that other devices or circuits may be connected to the AC coupling circuit 106 in place of the differential amplifier. In the embodiment of the circuit 100 described herein, the differential amplifier 110 serves to amplify the AC component of a signal transmitted via the transmission line 104. Thus, the AC coupling circuit serves to remove the DC component of the signal, which serves to reduce the possibility of the differential amplifier saturating.

Having described the circuit 100 including the AC coupling circuit 106, the AC coupling circuit 106 will now be described in greater detail.

Figure 2:
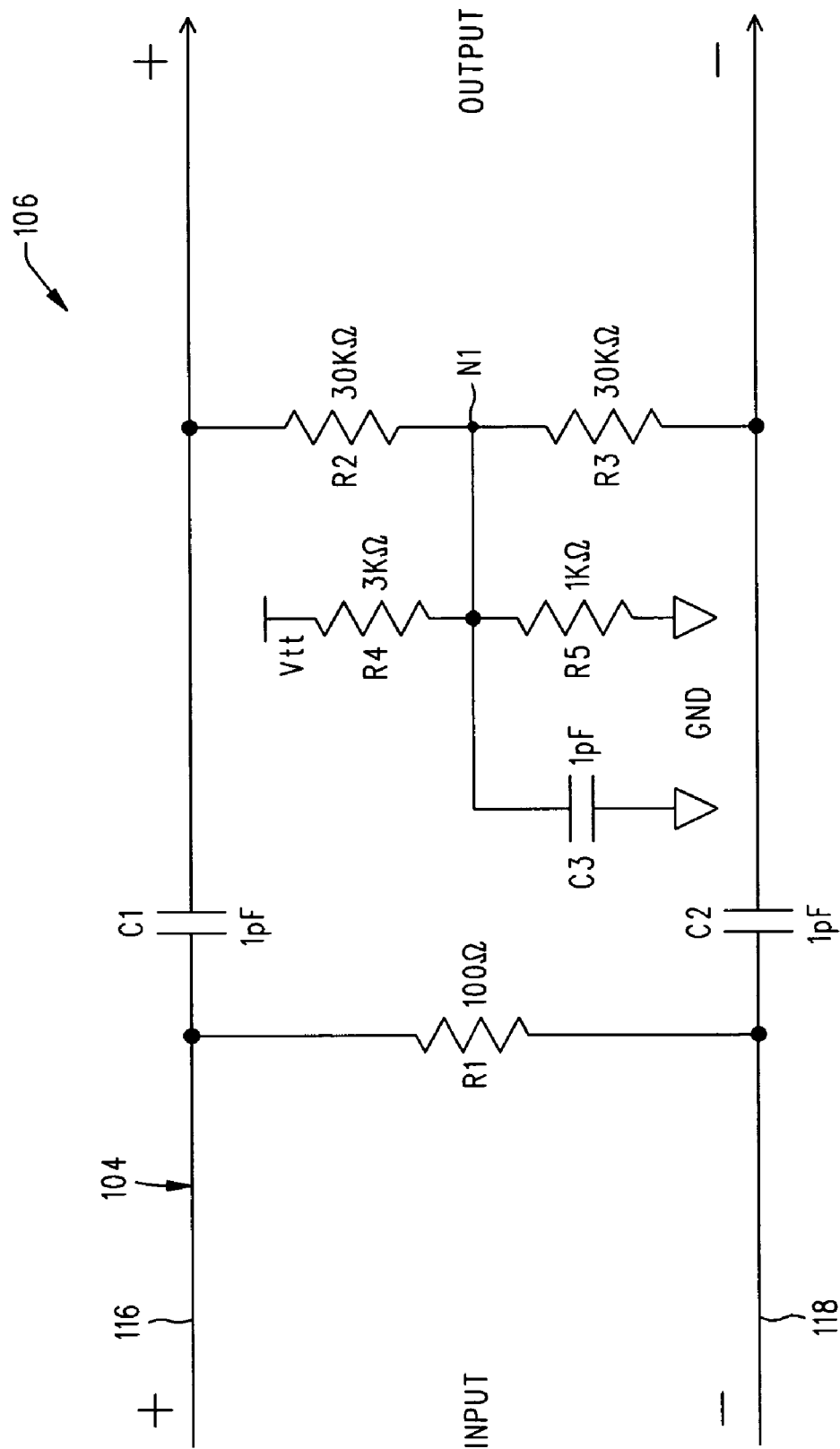
FIG. 2 is a schematic diagram of an embodiment of the AC coupling circuit of FIG. 1.

An embodiment of the AC coupling circuit 106 is shown in FIG. 2. The values of the components used in the AC coupling circuit 106 of FIG. 2 are solely exemplary values and it is to be understood that other component values may be selected depending on the requirements of the AC coupling circuit 106. All the components of the AC coupling circuit 106 may be fabricated onto a single substrate in an integrated circuit, not shown.

The AC coupling circuit 106 has an input consisting of two conductors, which are referred to herein as a positive input and a negative input. As described above, the embodiment of the AC coupling circuit 106 described herein is configured to receive a differential input, thus, the inputs are referred to as positive and negative. The differential inputs are also referred to as a first differential input and a second differential input. The AC coupling circuit outputs a differential signal on the output. Therefore, the output has two conductors, which are referred to as a positive output and a negative output. The differential outputs are also referred to as a first differential output and a second differential output.

A resistor R1, sometimes referred to as a first resistor, is connected between the positive input and the negative input. The value of the resistor R1 is chosen to match the characteristic impedance of the transmission line 104, FIG. 1. The value of R1 shown in FIG. 2 is one hundred ohms, which corresponds to a differential transmission line, wherein each line has an characteristic impedance of approximately fifty ohms. The characteristic impedance of the transmission line 104, FIG. 1, may depend on many variables, including the materials used in the substrate of the integrated circuit.

A capacitor C1, sometimes referred to as a first capacitor, is connected between the positive input and the positive output. The capacitor C1 serves as an AC coupling or DC blocking capacitor. A capacitor C2, sometimes referred to as a second capacitor, is connected between the negative input and the negative output. As with the capacitor C1, the capacitor C2 serves as an AC coupling or DC blocking capacitor. The capacitors C1 and C2 also serve to establish high pass filters within the AC coupling circuit 106 as described in greater detail below. In the exemplary embodiment of the AC coupling circuit 106 of FIG. 2, both the capacitor C1 and the capacitor C2 have values of one picofarad. Such a small value capacitor may be fabricated into a substrate of an integrated circuit along with the other components of the AC coupling circuit 106. Conventional AC coupling circuits typically require larger value capacitors that are physically too large to be readily fabricated into an integrated circuit substrate. Conventional integrated circuits required that the blocking capacitor be located before the termination resistor. Thus, the termination resistor becomes a component affecting the frequency response of the circuit. Because the termination resistor typically has a low value, the capacitor needs to have a high value. In one embodiment of the AC coupling circuit 106, the values of the capacitors C1 and C2 are chosen so as to enable them to be fabricated into an integrated circuit.

A resistor R2, sometimes referred to as a second resistors, is connected between the positive output and a node N1. A resistor R3, sometime referred to as a third resistor, is connected between the negative output and the node N1. The values of the resistors R2 and R3 are selected, in part, based on the above-mentioned high pass filters. In the embodiment of the AC coupling circuit 106 described in FIG. 2, the resistors R2 and R3 have values of thirty kilohms. A potential relative to a ground may be applied at the node N1. The potential is described in greater detail below.

The combination of the capacitor C1 and the resistor R2 serves as a high pass filter between the input and the output. Accordingly, signals having frequencies below a predetermined frequency will be attenuated by the high pass filter of the capacitor C1 and the resistor R2. Thus, the DC component of the signal, along with low frequency components, will be blocked. In the embodiment of the AC coupling circuit 106 described herein, the high pass filter is set at approximately thirty nanoseconds, which corresponds to a frequency of approximately thirty three megahertz. The high pass filter established by capacitor C2 and resistor R3 has the same characteristics as the high pass filter established by capacitor C1 and resistor R2.

As briefly described above, a potential relative to ground may be applied to the node N1. Several different embodiments of applying a potential to the node N1 may be used. In the embodiment of FIG. 2, the potential is established by way of a voltage divider consisting of a resistor R4 and a resistor R5. The resistors R4 and R5 serve to divide a voltage Vtt. The values of the resistors R4 and R5 are small enough relative to the values of the resistors R2 and R3 so not as to impact the above-described high pass filtering. In the embodiment described herein, resistor R4 has a value of three kilohms and resistor R5 has a value of one kilohm. Therefore, the voltage at node N1 is approximately one quarter of the voltage Vtt. A capacitor C3 is connected between the node N1 and ground and serves to reduce noise and transient voltages at node N1.

Having described the components of the AC coupling circuit 106, the operation of the AC coupling circuit 106 will now be described in greater detail below.

Referring to FIG. 1, the AC coupling circuit 106 couples a transmission line 104 to an electronic device, which, in the embodiment described herein, is a differential amplifier 110. As stated above, the transmission line 104 has an characteristic impedance associated therewith and the differential amplifier 110 may have a high impedance input. Thus, coupling is required between the transmission line 104 and the differential amplifier 110 in order to avoid voltage reflections. A signal is transmitted by way of the transmission line 104, wherein the signal may have a DC voltage component. The AC coupling circuit 106 serves to remove the DC voltage component so that it will not be amplified by the differential amplifier 110.

Referring to FIG. 2, the input is a differential input. Accordingly, the resistor R1 serves as a termination resistor and is matched to the combined characteristic impedance of the conductors 116 and 118. In the embodiment of the AC coupling circuit 106 of FIG. 2, the characteristic impedance of the conductors 116 and 118 is approximately fifty ohms each. Therefore, the value of R1 is one hundred ohms in order to match the characteristic impedance of the conductors 116 and 118.

In the embodiment of the AC coupling circuit 106 described herein, the values of the capacitors C1 and C2 are small enough so that they may be fabricated into a substrate of an integrated circuit. As described in greater detail below, the values of the capacitors C1 and C2 may be small because they are part of high pass filters rather than strictly serving as AC coupling or DC blocking capacitors. Prior to the AC coupling circuit 106 described herein, the AC coupling capacitors were typically too large to be readily fabricated into the substrate of an integrated circuit.

The capacitors C1 and C2 and the resistors R2 and R3 serve to form high pass filters, which couple AC signals and block DC voltages. More specifically, a first high pass filter is established using the capacitor C1 and the resistor R2. A second high pass filter is established using the capacitor C2 and the resistor R3. The embodiments of the high pass filters of FIG. 2 have cutoff frequencies of approximately thirty three megahertz at three dB per decade. High pass filters having other characteristics may be designed by changing the values of C1, C2, R2, and R3.

The impedance of the output may drive a high impedance load, such as the differential amplifier 110, FIG. 1. Therefore, the output of the AC coupling circuit 106 does not need to be matched to the input of the load.

As set forth above, the small values of the capacitors C1 and C2 enable the entire AC coupling circuit 106 to be fabricated onto a substrate of an integrated circuit. Therefore, no external AC coupling capacitors are required if the AC coupling circuit 106 is fabricated into a single integrated circuit.

What is claimed is:

1. An AC coupling circuit comprising:
   a first differential input;
   a second differential input;
   a first resistor having a first terminal and a second terminal, said first terminal directly connected to said first differential input and said second terminal directly connected to said second differential input;
   a first capacitor having a first terminal and a second terminal, the first capacitor first terminal connected to said first differential input and the first capacitor second terminal connected to a first differential output;
   a second capacitor having a first terminal and a second terminal, the second capacitor first terminal connected to said second differential input and the second capacitor second terminal connected to a second differential output;
   a second resistor having a first terminal and a second terminal, the second resistor first terminal connected to said first differential output and the second resistor second terminal connected to a node;

a third resistor having a first terminal and a second terminal, the third resistor first terminal connected to said second differential output and the third resistor second terminal connected to said node; and a first potential applied to said node.

2. The circuit of claim 1, wherein said first differential input is connectable to a first conductor of a differential transmission line having an characteristic impedance associated therewith, wherein said second differential input is connectable to a second conductor of said transmission line, and wherein the value of said first resistor matches said characteristic impedance of said transmission line.

3. The circuit of claim 1, wherein the value of said first resistor is approximately one hundred ohms.

4. The circuit of claim 1, wherein the value of said first capacitor is approximately one picofarad.

5. The circuit of claim 1, wherein the value of said second capacitor is approximately one picofarad.

6. The circuit of claim 1, wherein the value of said second resistor is approximately thirty kilohms.

7. The circuit of claim 1, wherein the value of said third resistor is approximately thirty kilohms.

8. The circuit of claim 1, wherein said circuit is fabricated onto a single substrate.

9. The circuit of claim 1, and further comprising:
   a fourth resistor connected between a second potential and said node; and
   a fifth resistor connected between a third potential and said node.

10. The circuit of claim 9, wherein said third potential is ground.

11. The circuit of claim 9, wherein the value of said fourth resistor is three times the value of said fifth resistor.

12. The circuit of claim 9, and further comprising a capacitor connected between said node and said third potential.

13. The circuit of claim 1, wherein said first capacitor and said second resistor form a high pass filter between said first differential input and said first differential output, and wherein said high pass filter has a cutoff frequency of approximately thirty megahertz.

14. A communication system comprising:
   a differential transmission line having an characteristic impedance associated therewith, said differential transmission line comprising a first conductor and a second conductor;
   an AC coupling circuit comprising a first differential input, a second differential input, a first differential output, and a second differential output, wherein said first differential input is electrically connected to said first conductor of said differential transmission line, and wherein said second differential input is electrically connected to said second conductor of said differential transmission line; and
   an electronic device electrically connected to said first differential output and said second differential output of said AC coupling circuit;

wherein said AC coupling circuit comprises:
   a first resistor having a first terminal and a second terminal, the first resistor first terminal directly connected to said first differential input and the first resistor second terminal directly connected to said second differential input, wherein said first resistor matches said characteristic impedance of said differential transmission line;
   a first capacitor having a first terminal and a second terminal, the first capacitor first terminal connected to said first differential input and the first capacitor second terminal connected to said first differential output;
   a second capacitor having a first terminal and a second terminal, the second capacitor first terminal connected to said second differential input and the second capacitor second terminal connected to said second differential output;
   a second resistor having a first terminal and a second terminal, the second resistor first terminal connected to said first differential output and the second resistor second terminal connected to a node;
   a third resistor having a first terminal and a second terminal, the third resistor first terminal connected to said second differential output and the third resistor second terminal connected to said node; and
   a first potential applied to said node.

15. The circuit of claim 14, wherein the value of said first resistor is approximately one hundred ohms.

16. The circuit of claim 14, wherein the value of said first capacitor is approximately one picofarad.

17. The circuit of claim 14, wherein the value of said second capacitor is approximately one picofarad.

18. The circuit of claim 14, wherein the value of said second resistor is approximately thirty kilohms.

19. The circuit of claim 14, wherein the value of said third resistor is approximately thirty kilohms.

20. The circuit of claim 14, wherein said circuit is fabricated onto a single substrate.

21. The circuit of claim 14, wherein said potential comprises:
   a fourth resistor connected between a second potential and said node;
   a fifth resistor connected between a third potential and said node.

22. The circuit of claim 21, wherein said third potential is ground.

23. The circuit of claim 21, wherein the value of said fourth resistor is three times the value of said fifth resistor.

24. The circuit of claim 21, and further comprising a capacitor connected between said node and said third potential.

25. The circuit of claim 14, wherein said first capacitor and said second resistor form a high pass filter between said first differential input and said first differential output, and wherein said high pass filter has a cutoff frequency of approximately thirty megahertz.

* * * * *